United States Patent [19]

Fujimaki et al.

[11] Patent Number: 4,485,205

[45] Date of Patent: Nov. 27, 1984

[54] RUBBER COMPOSITIONS SUITABLE FOR TIRES COMPRISING AMORPHOUS STYRENE-BUTADIENE COPOLYMER

[76] Inventors: Tatsuo Fujimaki, 2800-1, Ogawahigashi-cho, Kodaira City, Tokyo; Tomoharu Yamada, 29-1, Onta-cho 2-chome, Higashimurayama City, Tokyo; Keiko Katayama, 32-9, Hiraoka-cho, Hachioji City, Tokyo; Seisuke Tomita, 4-5-708, Hon-cho 1-chome, Higashimurayama City, Tokyo, all of Japan

[21] Appl. No.: 444,913

[22] Filed: Nov. 29, 1982

Related U.S. Application Data

[63] Continuation of Ser. No. 231,529, Feb. 4, 1981, abandoned.

[30] Foreign Application Priority Data

Feb. 8, 1980 [JP] Japan .................................. 55-13537

[51] Int. Cl.$^3$ ........................... C08L 9/06; C08K 3/04
[52] U.S. Cl. ................................ 524/526; 152/209 R; 524/518; 525/211; 525/237; 525/914
[58] Field of Search ...................... 525/211, 237, 914; 524/526

[56] References Cited

U.S. PATENT DOCUMENTS

| | | | |
|---|---|---|---|
| 3,498,963 | 3/1970 | Ichikawa et al. | 526/138 |
| 3,522,332 | 7/1970 | Ichikawa et al. | 526/138 |
| 4,220,564 | 9/1980 | Tanimoto et al. | 525/237 |

FOREIGN PATENT DOCUMENTS

| | | | |
|---|---|---|---|
| 46-37418 | 11/1971 | Japan | 525/237 |
| 1504734 | 3/1978 | United Kingdom | 525/237 |

*Primary Examiner*—Wilbert J. Briggs
*Attorney, Agent, or Firm*—Sughrue, Mion, Zinn, Macpeak & Seas

[57] ABSTRACT

Rubber compositions for tires having low rolling resistance and excellent running stability consist mainly of a rubber blend consisting of 10–90% by weight of a high vinyl amorphous butadiene-styrene copolymeric rubber obtained by copolymerizing styrene with 1,3-butadiene and containing 3–30% by weight of bonded styrene and not less than 60% by weight of 1,2-bond in butadiene unit, and 90–10% by weight of a dienic rubber having a glass transition temperature of lower than −60° C.

11 Claims, 1 Drawing Figure

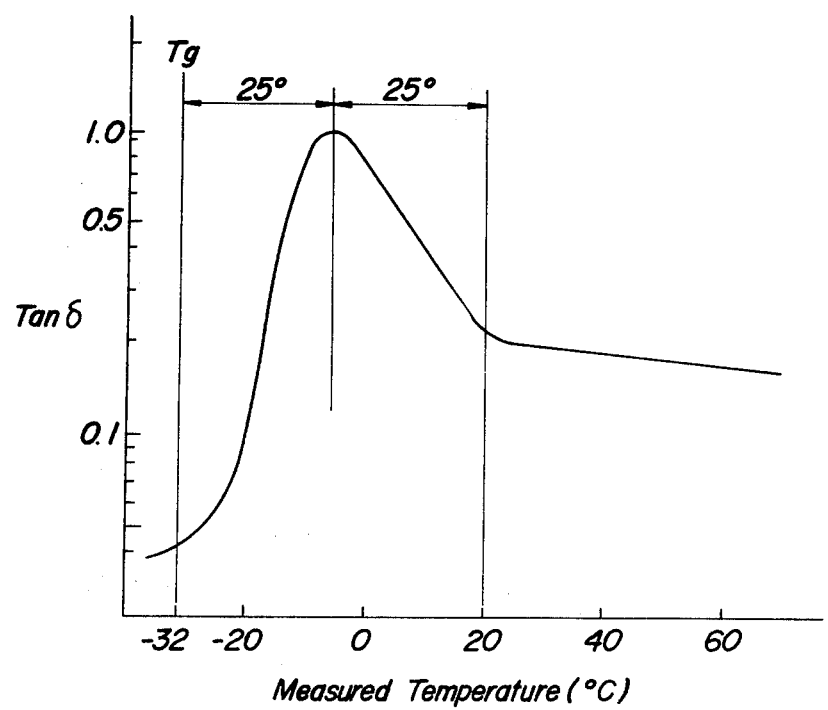

RUBBER COMPOSITIONS SUITABLE FOR TIRES COMPRISING AMORPHOUS STYRENE-BUTADIENE COPOLYMER

CROSS REFERENCE TO RELATED APPLICATIONS

This application is a continuation of application Ser. No. 231,529, filed Feb. 4, 1981 now abandoned.

The present invention relates to rubber compositions suitable for pneumatic tire treads which can concurrently satisfy the rolling resistance, wet skid resistance and wear resistance.

Recently, resource saving and energy saving have been socially demanded and investigations for developing automobiles with low gasoline consumption have been directed not only to the improvement of engine but also to development of so-called low fuel consumption tires by which the power loss is reduced.

It has been generally known that if the rolling resistance of a tire is low, the gasoline consumption of an automobile is saved and the rolling resistance of a tire is greatly controlled by the quality, that is kind and physical properties of the tread rubber. That is, if materials having low glass transition temperature Tg or low hysteresis loss are used, the rolling resistance can be reduced.

For example, it has been known that a blend of styrene-butadiene copolymeric rubber (SBR) with natural rubber (NR) or polybutadiene rubber (BR), or a low styrene SBR is used instead of SBR generally broadly used as a tread rubber. However, these rubbers are extremely lower in the running stability, such as wet skid resistance and braking performance on wet road and it has been very difficult to concurrently satisfy the rolling resistance and the running stability on wet road at once.

As described in British Pat. Nos. 1,166,832 and 1,261,371, rubber compositions consisting mainly of BR having a high content of 1,2-bond, that is high vinyl BR have been known. In such high vinyl BR, 1,2-bond more raises Tg than cis-1,4-bond and trans-1,4-bond, so that the running stability is improved and further since Tg is raised owing to 1,2-bond, the heat generation is not deteriorated but when 1,2-bond becomes more than 60% by weight, the breakage and abrasion resistances are considerably lowered and said high vinyl BR alone cannot be practically used and other diene rubbers must be blended but if it is intended to improve the breakage and abrasion resistances by blending natural rubber or prior high cis-BR, the running stability is deteriorated, and when SBR is blended, the rolling resistance is apt to be larger. Accordingly, even in the above described high vinyl BR, it has been very difficult to improve the wear resistance and to concurrently satisfy the running stability and rolling resistance.

Recently, it has been known as in Japanese Patent Laid-open Application No. 62,248/79 to improve the rolling resistance and running stability by using SBR having styrene content of 20–40% by weight and 1,2-bond content in the bonded butadiene of 50–80% by weight but all the polymer consists of said SBR, so that satisfied results have not been always obtained.

Thus, since all the polymer consists of said SBR, the running stability is more improved than the prior SBR but the rolling resistance is not yet satisfied. And if it is intended to improve the rolling resistance by blending high cis-BR or NR, the running stability is reversely deteriorated. In order to generally obtain excellent rolling resistance, it is desirable to reduce an amount of a softening agent or an aromatic oil added but in this case, the SBR has a number of problems when running tire or producing tire. The former typical problem is due to the fact that in SBR the breakage strength and elongation at high temperatures are noticeably lowered. Namely, when a tire runs on a nonpaved road, cuts and cracks are apt to be formed on the tread surface. The latter problem is that when a tread is formed through an extruder, the plasticizing effect owing to a softener cannot be expected, so that the tire generates heat due to shearing deformation in the extruder and in summer or upon operation of the extruder at a high speed, scorch is readily caused and the productivity is noticeably retarded. As mentioned above, SBR is low in the rupture elongation at high temperature, so that when a vulcanized tire is taken out from a mold, tread scratch is formed by mold.

Accordingly, it has never been yet attained to obtain rubber compositions concurrently satisfying both the rolling resistance and running stability while maintaining excellent breakage and wear resistances.

It has been already known from "Proceedings of the Royal Society A274,21 (1963)" that the improvement of the friction coefficient on wet road can be attained by using a material having high hysteresis loss, which dissipates deformation energy of a rubber, because the tread surface contacting a road surface is subjected to deformation at high speed due to fine unevenness of the road surface and therefore the larger the dissipation of energy due to mechanical loss, the larger the friction force is. But, such a material having the high hysteresis loss is high in the heat generation upon rolling the tire and therefore the rolling resistance is poor.

The inventors have diligently made study for solving the above described drawbacks and noticed that the deformation at the friction surface of the tread occurs at high speed and the hysteresis loss in the deformation at high speed has a great influence on the friction force, that is the running stability of the tire, while the deformation of the tread owing to ground contact, which has a great influence on the rolling resistance of the tire, corresponds to the rotation speed of the tire, so that the hysteresis loss at the deformation of less than 100 Hz has a great influence on the rolling resistance. According to temperature-time deducibility by Williams, Landel and Ferry, it is supposed that the hysteresis at deformation at high speed controlling the running stability conforms to the hysteresis loss measured at a lower temperature than the temperature at which the tire is used, so that the inventors have made study concerning the condition under which the hysteresis loss is made to be larger in order to improve the running stability and found that such a hysteresis has a close relation to the hysteresis measured at about 0° C. in the dynamic measurement of 1.5 Hz and concerning the rolling resistance, the hysteresis loss has a close relation to one measured at 50°–70° C. Thus, if the hysteresis loss at about 0° C. is larger and the hysteresis loss at 50°–70° C. is smaller, rubber compositions wherein both the running stability and rolling resistance are concurrently improved, can be obtained.

The present invention consists in rubber compositions for tire consisting mainly of a rubber blend of 10–90% by weight of high vinyl amorphous butadiene-styrene copolymeric rubber containing 3–30% by weight of bonded styrene and not less than 60% by weight of 1,2-bond in the butadiene unit, and 90–10% by weight of a diene rubber having glass transition temperature of lower than −60° C.

The high vinyl amorphous butadiene-styrene copolymeric rubbers to be used in the present invention contain 3–30% by weight, preferably 3–10% by weight of bonded styrene and not less than 60% by weight, preferably from more than 80% to 95% by weight of 1,2-bond in the butadiene unit. When an amount of the bonded styrene is less than 3% by weight, the resulting copolymeric rubber is not substantially different from the high vinyl BR and the effect for improving the breakage and wear resistances due to introduction of styrene group cannot be expected, while when said amount exceeds 30% by weight, the hysteresis loss at about 0° C. becomes larger and the running stability is improved but the hysteresis loss at 50°–70° C. also becomes concurrently larger, so that the rolling resistance is noticeably deteriorated. When an amount of 1,2-bond is less than 60% by weight, the running stability is not substantially improved, so that such an amount is not preferable. Tg of the high vinyl amorphous butadiene-styrene copolymeric rubbers is preferred to be −35° C. to 0° C. This is based on the following reason. When the relation of the mechanical loss (tan δ) to Tg is determined with respect to a high vinyl amorphous butadiene-styrene copolymeric rubber (bonded styrene: 5% by weight, 1,2-bond in butadiene unit: 85% by weight, Tg: −32° C.) to be used in the present invention, the relation as shown in FIG. 1 is obtained. From FIG. 1, it is apparent that the temperature showing the maximum value of tan δ is Tg+25° C. and the temperature at which the tan δ value becomes plane is the zone higher than Tg+50° C. and the zone lower than Tg. This relation is established in the high vinyl amorphous butadiene-styrene copolymeric rubbers of the present invention in which the bonded styrene is not more than 30% by weight and 1,2-bond in butadiene unit is not less than 60% by weight. Accordingly, in rubber compositions blended with polybutadiene rubber, styrene-butadiene copolymeric rubber or ethylene-propylene-diene ternary copolymeric rubber which is not compatible to the high vinyl amorphous butadiene-styrene copolymeric rubbers, the glass transition temperatures Tg of these rubbers appear respectively and are not united, so that Tg of the high vinyl amorphous butadiene-styrene copolymeric rubber appears as it is as Tg of the composition, so that if Tg of the high vinyl amorphous butadiene-styrene copolymeric rubber is within the range of −35° C. to −10° C., tan δ enough to improve the running stability on wet road is obtained at about 0° C. On the other hand, in rubber compositions blended with natural rubber or synthetic polyisoprene rubber having compatibility with the high vinyl amorphous butadiene-styrene copolymeric rubbers, the glass transition temperatures are united, so that even if Tg of the high vinyl amorphous butadiene-styrene copolymeric rubbers is within the range of −35° C. to 0° C., the satisfactory tan δ is obtained at about 0° C.

In the present invention, as rubbers to be blended with the high vinyl amorphous butadiene-styrene copolymeric rubbers, use may be made of diene rubbers having Tg of lower than −60° C. This is based on the following reason that even though the high vinyl amorphous butadiene-styrene copolymeric rubbers is higher in Tg than other usual rubbers, Tg is raised owing to 1,2-bond, so that such copolymeric rubbers have the specific property that the heat generation is low but the rubbers capable of being blended without deteriorating this property must be ones having Tg of lower than −60° C. That is, these rubbers having Tg of lower than −60° C. show the maximum value of tan δ at the temperature range of lower than −35° C., so that even if these rubbers are blended with the high vinyl amorphous butadiene-styrene copolymeric rubbers, the tan δ values at about 0° C. and 50°–70° C. are not substantially influenced.

When polybutadiene rubber, styrene-butadiene copolymeric rubber or ethylene-propylene-diene ternary copolymeric rubber among diene rubbers is blended, these rubbers have no compatibility with the high vinyl amorphous butadiene-styrene copolymeric rubbers, so that the glass transition temperatures of the polymers are not united, and therefore the blended amount can be freely varied depending upon the use and the amount of these rubbers blended is 10–90 parts by weight in 100 parts by weight of the blend rubber. In particular, when using for tire tread running on bad road, said amount is 40–90 parts by weight and in tire tread and side wall for good road in which the running stability, weather resistance and heat aging resistance are important, the blended amount is preferred to be about 10–60 parts by weight.

When natural rubber or synthetic polyisoprene rubber among dienic rubbers is blended, these rubbers are compatible with the high vinyl amorphous butadiene-styrene copolymeric rubbers in any ratio and the glass transition temperatures are united and a glass transition temperature averaged following to the volume percentage of these polymers is obtained. Therefore when the amount of natural rubber or synthetic polyisoprene rubber blended is 20–80 parts by weight in 100 parts by weight of the blend rubber, it is possible to make tan δ at about 0° C. larger and tan δ at 50°–60° C. smaller.

In the present invention, it is preferable to incorporate 1–40 parts by weight of a softening agent and 5–70 parts by weight of carbon black based on 100 parts by weight of the blend rubber and when the softening agent exceeds 40 parts by weight and carbon black exceeds 70 parts by weight, the heat generation of the rubber composition becomes higher and the rolling resistance is increased and such amounts are not preferable.

In the rubber compositions of the present invention, compounding agents used in the usual rubber industry, such as vulcanizing agent, accelerating agent, promoter assistant, antioxidant and the like may be incorporated.

The rubber compositions of the present invention are excellent in the wear resistance and breakage resistance and have noticeably improved running stability and rolling resistance, so that the rubber compositions are suitable for tire tread. Furthermore, in the high vinyl amorphous butadiene-styrene copolymeric rubbers used as the main component in the rubber compositions of the present invention, more than 60% of the double bond contained in the rubbers is present in the side chain, so that the breakage of the main chain due to oxygen or ozone is very few and said copolymeric rubbers have far more excellent heat aging resistance and weather resistance than prior styrene-butadiene copolymeric rubbers, so that the rubber compositions of the present invention are suitable for side wall and carcass and the like.

For better understanding of the invention, reference is taken to the accompanying drawing, wherein:

FIG. 1 is a curve showing the relation of the temperature dependency of tan δ to Tg in the high vinyl butadiene-styrene copolymeric rubber.

The following examples are given for the purpose of illustration of this invention and are not intended as limitations thereof.

EXAMPLE 1

Various polymers shown in the following Table 1 were used in the production of rubber compositions. Polymers A-G were produced by a polymerization by using n-butyl-lithium as a catalyst and potassium dodecylbenzenesulfonate and diethylene glycol dimethyl ether as a modifier in a toluene solvent under a constant temperature atmosphere. Polymer H is SBR 1204 and Polymer I is SBR 1500. Styrene content in the polymer was measured by the gas chromatography, and the content of 1,2-bond in the butadiene units was measured by the infrared spectrometer. The glass transition temperature of the polymer was measured by means of a differential scanning calorimeter made by Perkin Elmer Corp., and the tan δ thereof was measured by means of a mechanical spectrometer (dynamic shear strain amplitude: 0.5%) made by Rheometrics Corp.

The breakage strength was measured according to JIS K6301.

Extrusion temperature:

The surface temperature of a rubber composition just after extrusion was measured by means of a 8 inch hot tuber.

Wear resistance:

After a tire was run on road by a distance of 10,000 km, the depth of the remaining groove was measured, and the running distance of the tire required for wearing 1 mm of its tread was calculated and compared with the standard running distance of 8,000 km/mm wear. Index 100 corresponds to 8,000 km/mm. The larger index has a rubber composition, the higher the rubber composition is in the wear resistance.

Rolling resistance:

The rolling resistance of a tire was measured by a coast-down test at an initial speed of 100 kg/hr under an internal pressure of the tire of 1.7 kg/cm$^2$ and a load of JIS 100% load. Index 100 corresponds to the rolling resistance of 5.5 kg. The smaller is the index, the more excellent the rolling resistance of the tire is.

Braking performance on wet road:

A tire was suddenly braked during the running at a

TABLE 1

| Polymer | A | B | C | D | E | F | G | H | I |
|---|---|---|---|---|---|---|---|---|---|
| Styrene content (wt. %) | 5 | 15 | 25 | 25 | 23 | 35 | 0 | 25 | 23.5 |
| Content of 1,2-bond in butadiene units (wt. %) | 85 | 85 | 85 | 95 | 70 | 85 | 85 | 50 | 18 |
| Glass transition temperature (°C.) | −32 | −26 | −16 | −11 | −35 | −6 | −36 | −45 | −64 |
| Temperature at which tan σ exhibits the maximum value (°C.) | −7 | −1 | 10 | 14 | −10 | 20 | −10 | −20 | −40 |

Various rubber compositions were produced by using Polymers A-I according to the compounding recipe shown in the following Table 2.

TABLE 2

| | (Parts by weight) | |
|---|---|---|
| Rubber composition No. | 1-9 | 10 and 11 |
| Polymer listed in Table 1 | 50 | 100 |
| Natural rubber | 50 | |
| ISAF carbon black | 50 | 50 |
| Process oil | 10 | 10 |
| Zinc oxide | 4 | 4 |
| Stearic acid | 2 | 2 |
| N—Oxydiethylene-2-benzothiazylsulfenamide | 0.54 | 0.54 |
| Dibenzothiazyl disulfide | 0.3 | 0.3 |
| Sulfur | 2.0 | 2.0 |
| N—Phenyl-N'—isopropyl-p-phenylenediamine | 1.0 | 1.0 |

The tan δ, breakage strength and extrusion temperature of these rubber compositions were measured. Further, tires of 165 SR 13 size were produced by using the rubber composition in their tread, and the wear resistance, rolling resistance, braking performance on wet road, wet driving performance, cut resistance against snow chain and resistance against nonpaved road of the tires were evaluated. The obtained results are shown in the following Table 3. The evaluation methods are as follows.

Breakage strength:

speed of 80 km/hr on a wet concrete road covered with water in a depth of 3 mm, and the running distance of the tire after the tire was locked was measured. Index 100 corresponds to 42.3 m, and the smaller is the index, the more excellent the tire is in the braking performance on wet road.

Wet driving performance:

Obstacles were zigzag arranged on a wet concrete road covered with water in a depth of 3 mm at an interval of 30 m along the running direction of a tire and at an interval of 1 m along the direction perpendicular to the running direction of the tire, and the time required by the tire for passing a distance of 100 m along the outside of alternate obstacles at a speed as fast as possible was measured. Index 100 corresponds to 5.03 seconds. The smaller is the index, the more excellent the tire is in the wet driving performance.

Cut resistance against snow chain:

After a tire wound with a snow chain was run by a distance of 10,000 km in a snow district in winter, the tire was taken off from the car, and formation of crack and cut on the tread surface was observed.

Resistance against nonpaved road:

After a tire was run on a nonpaved road in a distance of 5,000 km, 70% of which was occupied by a surface consisting mainly of gravel, the tire was taken off from the car, and formation of crack and cut on the tread surface was observed.

TABLE 3

|  | Present invention | | | | | Comparative rubber composition | | | | | |
| --- | --- | --- | --- | --- | --- | --- | --- | --- | --- | --- | --- |
| Rubber composition No. | 1 | 2 | 3 | 4 | 5 | 6 | 7 | 8 | 9 | 10 | 11 |
| Polymer | A | B | C | D | E | F | G | H | I | A | E |
| tan σ (0° C.) | 0.42 | 0.55 | 0.62 | 0.70 | 0.32 | 0.80 | 0.30 | 0.20 | 0.30 | 0.70 | 0.32 |
| tan σ (70° C.) | 0.085 | 0.095 | 0.102 | 0.121 | 0.080 | 0.250 | 0.110 | 0.105 | 0.201 | 0.108 | 0.120 |
| Breakage strength (kg/cm$^2$) | 220 | 230 | 221 | 240 | 200 | 240 | 160 | 200 | 250 | 180 | 160 |
| Extrusion temperature (°C.) | 110 | 112 | 112 | 113 | 111 | 130 | 113 | 120 | 125 | 118 | 122 |
| Wear resistance | 101 | 102 | 103 | 105 | 106 | 96 | 70 | 97 | 100 | 93 | 88 |
| Rolling resistance | 70 | 73 | 75 | 82 | 67 | 110 | 77 | 77 | 100 | 78 | 83 |
| Braking performance on wet road | 88 | 80 | 76 | 75 | 92 | 78 | 93 | 100 | 100 | 77 | 92 |
| Wet driving performance | 90 | 82 | 75 | 78 | 96 | 80 | 97 | 101 | 100 | 80 | 90 |
| Cut resistance against snow chain (formation of crack and cut) | none | none | none | none | none | none | " | none | none | " | " |
| Resistance against nonpaved road (formation of crack and cut) | none | none | none | none | none | none | " | none | none | " | " |

It can be seen from Table 3 that the rubber composition of the present invention is excellent in the workability, breakage strength and wear resistance and further is excellent in both running stability and rolling resistance.

EXAMPLE 2

Various rubber compositions were produced according to the compounding recipe shown in the following Table 4, and evaluated in the same manner as described in Example 1. The obtained results are shown in Table 4.

What is claimed is:

1. Rubber compositions for tires consisting mainly of a rubber blend consisting of 10–90% by weight of a high vinyl amorphous butadiene-styrene copolymeric rubber obtained by copolymerizing styrene with 1,3-butadiene in the presence of an alkyl-lithium catalyst and containing 3–30% by weight of bonded styrene and not less than 60% by weight of 1,2-bond in the butadiene unit, and 90–10% by weight of a dienic rubber having a glass transition temperature of lower than −60° C., said dienic rubber being at least one member selected from the group consisting of natural rubber, synthetic polyisoprene rubber, polybutadiene rubber and ethylene-propylene-diene ternary copolymeric rubber.

TABLE 4

|  |  | Present invention | | | | | | Comparative rubber composition | |
| --- | --- | --- | --- | --- | --- | --- | --- | --- | --- |
|  | Rubber composition No. | 12 | 13 | 14 | 15 | 16 | 17 | 18 | 19 |
| Compounding recipe (parts by weight) | Polymer A | 50 | 50 | 50 | 50 | 50 | 15 | 70 | 5 |
|  | BR 01 *1 | 50 | — | — | — | 30 | 10 | — | 95 |
|  | IR 2200 *2 | — | 50 | — | — | — | — | — | — |
|  | SBR 1500 | — | — | 50 | — | — | — | — | — |
|  | EP 33 *3 | — | — | — | 50 | — | — | — | — |
|  | T 0202 *4 | — | — | — | — | — | — | 30 | — |
|  | NR (RSS #1) | — | — | — | — | 20 | 75 | — | — |
|  | ISAF carbon black | 50 | 50 | 50 | 50 | 50 | 50 | 50 | 50 |
|  | Aromatic oil | 10 | 10 | 10 | 10 | 10 | 10 | 10 | 10 |
|  | Zinc oxide | 4 | 4 | 4 | 4 | 4 | 4 | 4 | 4 |
|  | Stearic acid | 2 | 2 | 2 | 2 | 2 | 2 | 2 | 2 |
|  | N—Oxydiethylene-2-benzothiazylsulfenamide | 0.54 | 0.54 | 0.54 | 0.54 | 0.54 | 0.54 | 0.54 | 0.54 |
|  | Dibenzothiazyl disulfide | 0.3 | 0.3 | 0.3 | 0.3 | 0.3 | 0.3 | 0.3 | 0.3 |
|  | Sulfur | 2.0 | 2.0 | 2.0 | 2.0 | 2.0 | 2.0 | 2.0 | 2.0 |
|  | N—Phenyl-N'—isopropyl-p-phenylenediamine | 1 | 1 | 1 | 1 | 1 | 1 | 1 | 1 |
| Property | tan σ (0° C.) | 0.35 | 0.421 | 0.46 | 0.40 | 0.42 | 0.28 | 0.50 | 0.12 |
|  | tan σ (70°) | 0.08 | 0.082 | 0.081 | 0.083 | 0.080 | 0.09 | 0.26 | 0.081 |
|  | Breakage strength (kg/cm$^2$) | 240 | 230 | 230 | 220 | 240 | 250 | 190 | 240 |
|  | Extrusion temperature (°C.) | 108 | 110 | 112 | 112 | 110 | 106 | 120 | 110 |
|  | Wear resistance | 110 | 100 | 102 | 98 | 105 | 103 | 98 | 100 |
|  | Rolling resistance | 70 | 73 | 75 | 75 | 73 | 82 | 110 | 78 |
|  | Braking performance on wet road | 90 | 87 | 83 | 88 | 92 | 96 | 82 | 115 |
|  | Wet driving performance | 92 | 87 | 86 | 90 | 94 | 97 | 84 | 117 |
|  | Cut resistance against snow chain (formation of crack and cut) | none | none | none | none | none | none | " | none |
|  | Resistance against nonpaved road (formation of crack and cut) | none | none | none | none | none | none | none | none |

Note:
*1 made by Japan Synthetic Rubber Co., cis-1, 4-polybutadiene rubber Tg; −102° C.
*2 made by Japan Synthetic Rubber Co., cis-1, 4-polyisoprene rubber Tg; −77° C. *3 made by Japan Synthetic Rubber Co., ethylene-propylene-diene terpolymer rubber Tg; −62° C.
*4 made by Japan Synthetic Rubber Co., high styrene SBR (styrene content; 46 wt. %) Tg; −33° C.

It can be seen from Table 4 that the rubber composition of the present invention is excellent in the workability, breakage strength and wear resistance, and further excellent in both running stability and rolling resistance.

2. Rubber compositions as claimed in claim 1, wherein the glass transition temperature of the high vinyl amorphous butadiene-styrene copolymeric rubber is −35° C. to 0° C.

3. Rubber compositions for tires consisting mainly of a rubber blend consisting of 10–90% by weight of a high vinyl amorphous butadiene-styrene copolymeric rubber obtained by copolymerizing styrene with 1,3-butadiene in the presence of an alkyl-lithium catalyst containing 3–10% by weight of bonded styrene and more than 80% to 95% by weight of 1,2-bond in the butadiene unit, and 90–10% by weight of a dienic rubber having a glass transition temperature of lower than −60° C.

4. Rubber compositions as claimed in claim 3, wherein the glass transition temperature of the high vinyl amorphous butadiene-styrene copolymeric rubber is −35° C. to 0° C.

5. Rubber compositions as claimed in claim 3, wherein the dienic rubber is natural rubber, synthetic polyisoprene rubber, polybutadiene rubber, styrene-butadiene copolymeric rubber or ethylene-propylene-diene ternary copolymeric rubber.

6. Rubber compositions as claimed in claim 1, which contain 1–40 parts by weight of a softening agent and 5–70 parts by weight of carbon black, said parts by weight being based on 100 parts by weight of the rubber blend.

7. Rubber compositions as claimed in claim 2, which contain 1–40 parts by weight of a softening agent and 5–70 parts by weight of carbon black, said parts by weight being based on 100 parts by weight of the rubber blend.

8. Rubber compositions as claimed in claim 3, which contain 1–40 parts by weight of a softening agent and 5–70 parts by weight of carbon black, said parts by weight being based on 100 parts by weight of the rubber blend.

9. Rubber compositions as claimed in claim 4, which contain 1–40 parts by weight of a softening agent and 5–70 parts by weight of carbon black, said parts by weight being based on 100 parts by weight of the rubber blend.

10. Rubber compositions as claimed in claim 1, wherein said alkyl-lithium catalyst is n-butyl-lithium.

11. Rubber compositions as claimed in claim 3, wherein said alkyl-lithium catalyst is n-butyl-lithium.

* * * * *